Jan. 2, 1962 J. J. C. WUYCKENS 3,015,404
IMPROVEMENTS IMPARTED TO STOPPERS FOR VESSELS
OF THERMOPLASTIC MATERIAL
Filed Jan. 25, 1960
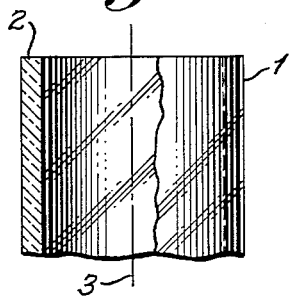
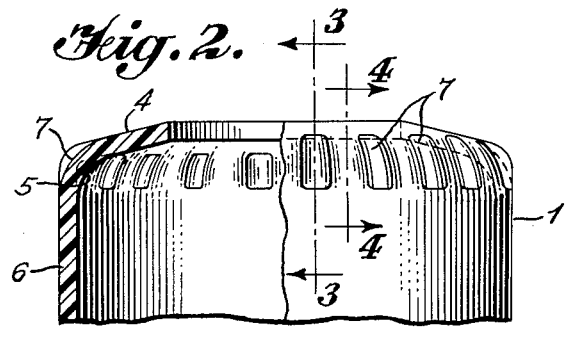
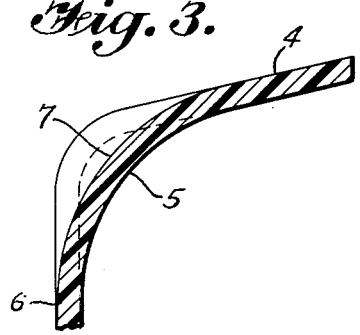
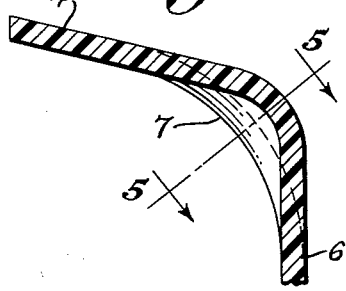
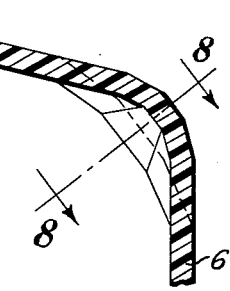
INVENTOR
Jean J. C. Wuyckens
BY Burns, Doane, Benedict & Schwam
ATTORNEYS United States Patent Office 3,015,404
Patented Jan. 2, 1962

3,015,404
IMPROVEMENTS IMPARTED TO STOPPERS FOR VESSELS OF THERMOPLASTIC MATERIAL
Jean Joseph Charles Wuyckens, Brussels, Belgium, assignor to Plax Corporation, Bloomfield, Conn., a corporation of Delaware
Filed Jan. 25, 1960, Ser. No. 4,410
Claims priority, application Belgium Mar. 27, 1959
1 Claim. (Cl. 215—31)

The present invention relates to improvements imparted to stoppers or closures for vessels of thermoplastic material and more specifically relates to improvements in the formation of the upper side or edge of the vessel neck to improve sealing cooperation with the stopper or closure engaged with the vessel neck.

The purpose of the invention is to insure sufficient tightness of the stopper or closure while using simple and economical means for achieving this end result.

The usual systems of stopping or closing vessels of glass with the use of a neck threaded on the outside, outside-threaded screw-cap and flat gasket placed against the bottom of the screw lid, made of a sufficiently compressible material, cease to be entirely satisfactory when it is a question of stopping vessels made of thermoplastic material with a relatively wide neck and relatively thin walls.

As long as the material used for the fabrication of bottles of thermoplastic material was "low density" polyethylene, the question never actually arose because the low intrinsic rigidity of this material made it necessary to select relatively substantial thicknesses of material for the sides (body and neck) with the result that in most cases the edges of the neck had a width of end face that was not very different from that of glass bottles and under such conditions, since the bearing surfaces were almost the same we managed to contrive the desired tightness, without too much difficulty, using the known system mentioned above.

The recent appearance of "high-density" polyethylenes, called "linear polyethylenes" has profoundly modified the data of the problem. As a matter of fact, due to the relatively high intrinsic rigidity of these new materials, which is much greater than that of "low density" polyethylene, it has become possible to produce vessels of thermoplastic material having sides considerably thinner than in the past, and in particular, much thinner than those of hollow bodies of glass having the same capacity, which offers the great advantage of producing lighter objects and consequently cheaper ones.

In the case of blown vessels, with relatively narrow necks, in spite of the thinning of the sides of the body there remains, at the mouth, a side thickness which is still sufficient, in combination with the narrowness of the orifice, to permit the application of the same classic system of stoppage with a screw cap.

However, when the blown hollow bodies have relatively wide necks, as in the case of pots, jars, bowls, etc. the thinning of the sides of the body also leads to a relatively thin sided neck and it has been practically impossible, up to now, to obtain a good seal with the usual system, particularly for the following reasons:

The large size of the mouth combined with the increased flexibility of the neck due to the thinness of the side, make it very difficult to obtain sufficient planeness of the end face of the edge of the neck and consequently a good contact of this edge with the bottom of the cap and its gasket;

The increased flexibility of the neck due to the thinness of the sides, prevents exerting the contact pressure, on the end face of the edge of the neck, that would be necesary for obtention of a good seal, because at such a pressure the least irregularity in shape (local thinness, ovalization, etc.) would make the side of the neck come away at certain points causing a break in contact and loss of the seal.

The thinness of the end face of the edge of the neck substantially reduces the bearing surface.

The present invention consists in that the edge of the neck of the vessel is extended by a flexible peripheral conical lip, with generatrixes slightly inclined to the horizontal, and connected to the cylindrical side of the neck by a rounded or polygonal groove.

The invention is illustrated, by way of example, in the attached drawing.

In this drawing:
FIGURE 1 shows the neck of a known vessel of glass whereof the end face 2, of the free edge (at the top) is entirely within a plane perpendicular to the axis of symmetry 3 of the neck.

FIGURE 2 shows an embodiment according to the present invention in vertical section, of a vessel or bottle neck with a flexible conical lip which is described in detail below.

FIGURE 3 is a section along line 3—3 in FIGURE 2.
FIGURE 4 is a section along line 4—4 in FIGURE 2.
FIGURE 5 is a section along line 5—5 in FIGURE 4.
FIGURE 6 is a section analogous to that in FIGURE 3 in the case of a polygonal groove.
FIGURE 7 is a section analogous to that in FIGURE 4, in the case of a polygonal groove.
FIGURE 8 is a section made along line 8—8 in FIGURE 7, and
FIGURE 9 is a section analogous to that in FIGURE 8, showing a variation.

We will now refer to the drawing.

When we place, on neck 1, an inside-threaded closure lid (not shown), by screwing it totally or partially, the bottom of this closure lid (not shown), perhaps lined with a gasket, drops into contact with the flexible peripheral lip 4, and forces it in turn to fold down around the groove 5. To increase the elasticity of the lip 4, and make it rest firmly against the bottom of the lid, tending to raise itself erect, the connection between the cylindrical side 6, of the neck 1, and the said lip 4, is fitted over its entire circumference with a series of small channels 7, placed in meridian planes of the neck (cf. FIGURES 2, 3, 4, 6 and 7), which has the effect of considerably stiffening the side in the region of the said connection. The form of the channels 7 is such that the hollows gradually become blunted at the ends and then "die out" on the cylindrical side 6, at their bottoms and on the lip itself at their tops (cf. FIGURES 2, 3, 4, 6 and 7). In cross section these channels or grooves can have various shapes, for example that of a continuous curve of the "sinusoid" type (FIGURE 5), or that of a line broken into straight segments (FIGURE 8) or curvilinear segments (FIGURE 9).

In the drawing the lip 4, is shown as pointing inward. It can point outward, however.

I claim:

A plastic neck portion for a container comprising a vertically disposed generally cylindrical wall portion, an annular generally frusto-conical lip portion integral with said wall portion, said lip portion extending inwardly and upwardly from the upper end of said wall portion and cooperating therewith to form an annular shoulder, said lip portion terminating in a closure receiving, central dispensing opening of substantially lesser diameter than that of said wall portion and disposed in a plane substantially above the plane of said upper end of said wall portion, and inwardly and upwardly extending grooves in said shoulder which terminate in said lip portion outside and below said central opening.

References Cited in the file of this patent

UNITED STATES PATENTS

| | | |
|---|---|---|
| 1,650,440 | Glacken | Nov. 22, 1927 |
| 2,088,181 | Swift | July 27, 1937 |
| 2,099,056 | Ferngren | Nov. 16, 1937 |